US010558586B1

(12) United States Patent
Paterra

(10) Patent No.: US 10,558,586 B1
(45) Date of Patent: Feb. 11, 2020

(54) SHIPPABLE STORAGE DEVICE FOR EXECUTING APPLICATIONS AND SECURELY STORING DATA

(71) Applicant: Amazon Technologies, Inc., Seattle, WA (US)

(72) Inventor: Frank Charles Paterra, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 228 days.

(21) Appl. No.: 15/194,074

(22) Filed: Jun. 27, 2016

(51) Int. Cl.
H04L 9/00 (2006.01)
G06F 21/00 (2013.01)
G06F 12/14 (2006.01)
H04L 29/08 (2006.01)
H04L 29/06 (2006.01)
G06F 1/26 (2006.01)
G06F 9/4401 (2018.01)
G06Q 10/08 (2012.01)

(52) U.S. Cl.
CPC .......... G06F 12/1408 (2013.01); G06F 1/263 (2013.01); G06F 9/4403 (2013.01); G06Q 10/0832 (2013.01); H04L 63/0428 (2013.01); H04L 63/06 (2013.01); H04L 67/10 (2013.01); G06F 2212/1052 (2013.01); G06F 2212/154 (2013.01); G06F 2212/402 (2013.01)

(58) Field of Classification Search
CPC .................................................. G06F 12/1408
See application file for complete search history.

(56) References Cited

U.S. PATENT DOCUMENTS

| 6,181,630 | B1* | 1/2001 | Caulkins | G06F 11/1441 365/183 |
| 8,621,101 | B1 | 12/2013 | Starr et al. | |
| 2003/0070081 | A1* | 4/2003 | Wee | H04L 63/04 713/189 |
| 2008/0010647 | A1 | 1/2008 | Chapel et al. | |
| 2008/0235404 | A1* | 9/2008 | Awakura | G06F 3/0605 710/1 |
| 2008/0263371 | A1* | 10/2008 | Weissman | G06F 21/575 713/193 |

(Continued)

Primary Examiner — Alexander Lagor
Assistant Examiner — Syed M Ahsan
(74) Attorney, Agent, or Firm — Robert C. Kowert; Kowert, Hood, Munyon, Rankin & Goetzel, P.C.

(57) ABSTRACT

A shippable storage device may be used to execute one or more applications, such as an encryption application, and to securely store client data on a storage node of the shippable storage device. After connecting the shippable storage device to a client network, a stateless compute node of the shippable storage device downloads operating code. After validating the operating code, the stateless compute node executes the operating code. The operating code may include an application, such as an encryption application that receives, encrypts, and stores client data. The application does not access writeable persistent storage other than through an internal network interface to the storage node, according to a networking protocol. The volatile memory of the stateless compute node is cleared upon removal of power to the shippable storage device so that unencrypted data and one or more encryption keys are not persisted within the shippable storage device.

20 Claims, 11 Drawing Sheets

(56) References Cited

U.S. PATENT DOCUMENTS

| | | | | |
|---|---|---|---|---|
| 2011/0173438 A1* | 7/2011 | Matzkel | ............... | H04L 9/0833 |
| | | | | 713/150 |
| 2013/0282919 A1* | 10/2013 | Richards, III | ........ | G06F 9/5072 |
| | | | | 709/238 |
| 2017/0235956 A1* | 8/2017 | Maletsky | ............. | G06F 21/575 |
| | | | | 726/1 |

* cited by examiner

SHIPPABLE STORAGE DEVICE FOR EXECUTING APPLICATIONS AND SECURELY STORING DATA

BACKGROUND

Growth of data storage capacity for computer systems has far outpaced the growth in transmission speed for transferring data over networks between computer systems. The discrepancy is so great that transmitting a large amount of data from one storage facility to another storage facility can be prohibitively costly (e.g., requiring costly system upgrades) or lengthy (e.g., transmission taking several months or longer). Physically moving the storage media may leave the data on legacy hardware or may not be an available option (e.g., when the data is stored by a storage service on behalf of the customer). Some solutions have involved transferring the data to a portable storage device (e.g., network attached storage devices) and shipping the portable storage device to another storage facility where the data is transferred to another storage system.

For example, when a customer of a storage service provider wishes to move a large quantity of data from the customer's site to a location at the storage service provider, the customer may save the data onto a device and ship the device to the storage service provider. However, the confidentiality of the data may be compromised for various reasons. For example, during shipment, mistakes may occur that prevent a storage device from being shipped to the correct destination. Moreover, the device may be intercepted by a third party. Thus, a malicious third party may access confidential data on the device. In some cases, the device may arrive at the storage service provider without any indication that unauthorized access occurred.

Further, different customers may use different types of storage devices to transfer data to the storage service provider. New storage devices and techniques are constantly being developed and adopted by customers. Therefore, as the amount of data transferred from customers grows, it may become increasingly difficult for a storage service provider to transfer the data from multiple disparate storage devices in a secure and efficient manner. Moreover, customers may lack the computing power to efficiently encrypt or otherwise process data before the data is securely stored onto a storage device.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement a shippable storage device to execute one or more applications and to securely store data. At least some of the data may be generated by the one or more applications. The shippable storage device may then be used to securely transfer the stored data from one location to another location. Due to limited processing capability and limited security mechanisms at a client site, the execution of one or more applications to generate data may be performed more efficiently and more securely by a shippable storage device. For example, an encryption application may be run faster and more securely by a shippable storage device than by a client device. Further, due to limited transmission speeds over networks, a large amount of data may be transferred from one location to another in a much shorter amount of time by using a shippable storage device instead of by using network transmission.

Techniques for executing one or more applications and securely storing data onto the shippable storage device may be implemented to ensure that the data will not be exposed to a third party if the shippable storage device is misplaced or intercepted during shipment from one location to another location. For example, encrypted data may be stored on a separate storage node, and encryption keys used to encrypt the data may be removed from volatile memory upon removal of power from the device.

Figure 1:
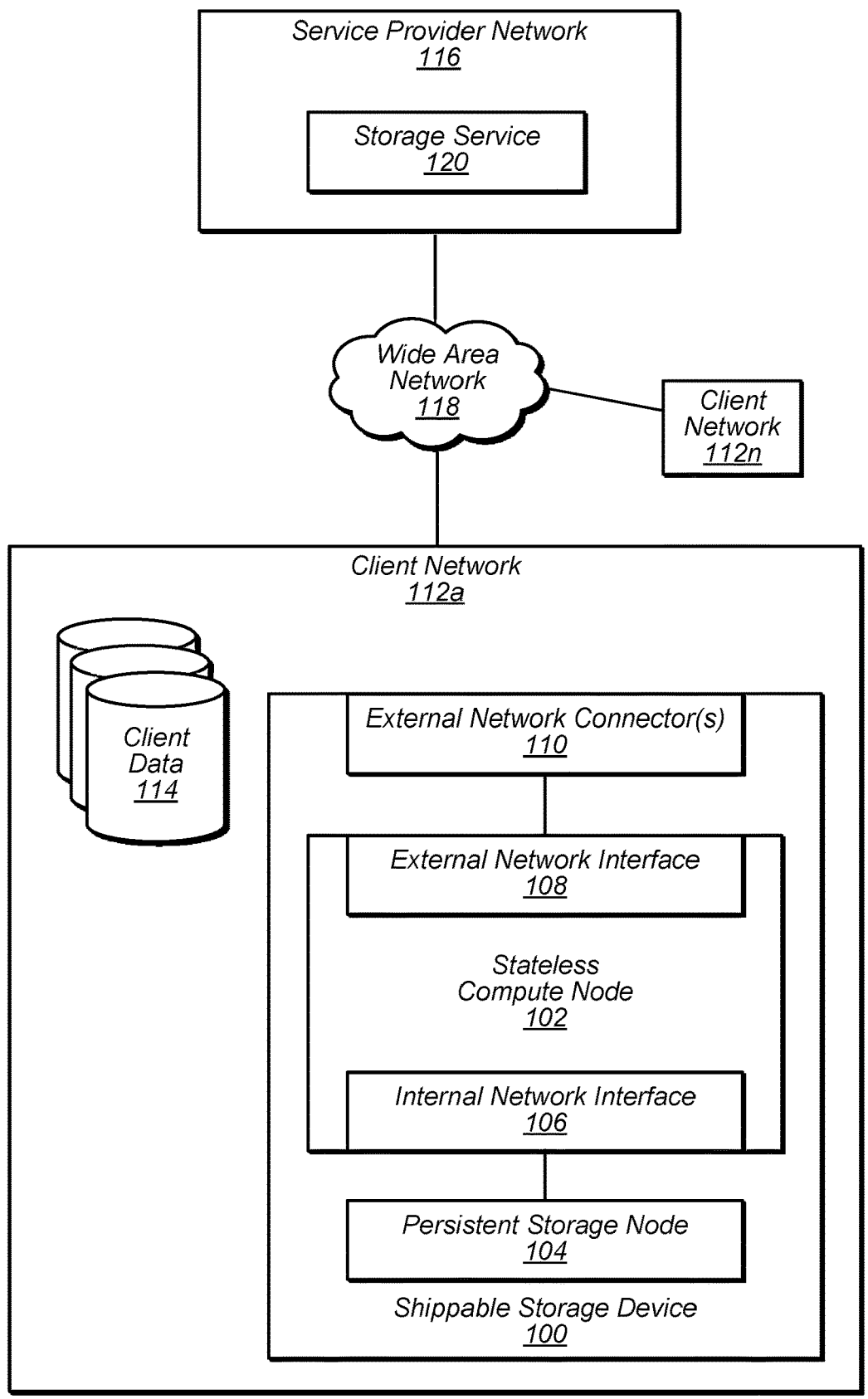
FIG. 1 illustrates a system for executing one or more applications and securely storing data using a shippable storage device, according to some embodiments.

FIG. 1 illustrates a system for executing one or more applications and securely storing data using a shippable storage device 100, according to some embodiments. The shippable storage device 100 depicted in FIG. 1 may be the same as the shippable storage device 100 depicted in FIGS. 2-11, in embodiments.

In the depicted embodiment, the shippable storage device 100 includes a stateless compute node 102 for executing one or more applications and a persistent storage node 104 for securely storing data. The stateless compute node 102 is coupled to the persistent storage node 104 via an internal network interface 106 of the stateless compute node 102. In some embodiments, the persistent storage node 104 may also include an internal network interface coupled to the internal network interface 106 of the stateless compute node 102.

In some embodiments, the stateless compute node 102 is logically and/or electrically and/or physically isolated/separate from the persistent storage node 104, other than being coupled via the internal network interface 106. In various embodiments, the nodes are on the same motherboard/device or on separate motherboards/devices. For example, the stateless compute node 102 may be a motherboard or other removable device and the persistent storage node 104 may be a different motherboard or different removable device. In an embodiment, the internal network interface may be a wireless interface, allowing the nodes to be in part, or completely, electrically and/or physically separate and/or logically separate.

The stateless compute node 102 also includes an external network interface 108. The stateless compute node 102 is coupled to one or more external network connectors 110 via the external network interface 106 of the stateless compute node 102. Thus, any reference to an external network connector 110 may, in embodiments, refer instead to multiple external network connectors 110. In the example embodiment, the shippable storage device 100 is connected to a client network 112a via the external network connector 110 of shippable storage device 100 and one or more corresponding network connectors or network interfaces of the client network 112a. In various embodiments, any suitable method for connecting the shippable storage device 100 to an external network, such as the client network 112a, may be used, including one or more physical cables or via one or more wireless connections.

The client network 112a includes client data 114 stored on one or more storage devices of the client network 112a. In the depicted embodiment, the client network 112a is connected to a service provider network 116 via a wide area network 118. In embodiments, the wide area network 118 may be one or more networks in between the client network 112a and the service provider network 116 (e.g., the Internet and/or other networks).

In various embodiments, one or more other client networks 112n may also be connected to the service provider network 116 via the wide area network 118. Each of the client networks 112n may also include corresponding client data and one or more shippable storage devices 100. Thus, in embodiments, the various descriptions of the client network 112a may also apply to each of the one or more client networks 112n.

The client network 112a may be a network of a client (e.g., customer) of the service provider network 116. For example, copies of at least some of the client data 114 of the client network 112a may be stored and backed up by the service provider network 116 on one or more storage devices of networks of the service provider network 116. For example, a client may store the client data 114 onto the shippable storage device 100 for shipment to the service provider network 116, so the data can be transferred from the shippable storage device 100 to the service provider network 116. In embodiments, the storage service provider 116 may provide a storage service 120. Thus, the service provider network 116 may store client data at one or more locations within the service provider network 116 using the storage service 120. In various embodiments, the service provider network 116 may provide one or more different services (e.g., other remote network-accessible services) instead of or in addition to remote data storage. Moreover, in embodiments, the shippable storage device 100 may instead be any other type of device suitable for executing applications and securely storing and/or transporting data.

In some embodiments, the stateless compute node 102 may receive, via the external network connector (e.g., download), a boot image, operating code, and/or other software application from the client network 112a or the service provider network 116 for execution by the stateless compute node 102. The stateless compute node 102 may also obtain data, such as at least a portion of the client data 114 of the client network 112a, and process the obtained data. The results may then be stored on the persistent storage node 104. In some cases, the results or a portion of the results may be output via the external network connector 110 instead of or in addition to being stored on the storage node. In embodiments, the stateless compute node 102 encrypts at least some of the results before storing the results onto the persistent storage node 104.

In embodiments, operating code or software applications executing on the stateless compute node 102 do not access writeable persistent storage other than through the internal network interface 106 to persistent storage within the persistent storage node 104, according to a networking protocol. Thus, access to the persistent storage node 104 by code executing on the stateless compute node 102 may be prevented for any operations that do not comply with the networking protocol. For example, the networking protocol may specify a set of rules, conventions, and/or a data structure (e.g., Ethernet protocol or other defined protocol) that governs how a device or node exchanges and transfers information over a network to another device or node.

In some cases, memory of the stateless compute node 102 is cleared upon removal of power to the shippable storage device, so that a state of one or more applications is not persisted on the stateless compute node 102. In embodiments, data generated by applications is not persisted on the stateless compute node 102. For example, encryption keys used to encrypt data for storage onto the persistent storage node 104 are not persisted on the stateless compute node 102. The above techniques may improve security and integrity of the client data 114 transferred to the persistent storage node 104.

This specification next includes a description of a shippable storage device that may be used for executing one or more applications, securely storing data, and/or securely transferring data from one location to another, such as from a client or customer to a storage service provider (or vice versa). A number of different techniques executing one or more applications, securely storing data, and/or securely transferring data are then discussed, some of which are illustrated in accompanying diagrams and flowcharts. Finally, a description of an example computing system upon which the various components, modules, systems, devices, and/or nodes may be implemented is provided. Various examples are provided throughout the specification.

Figure 2:
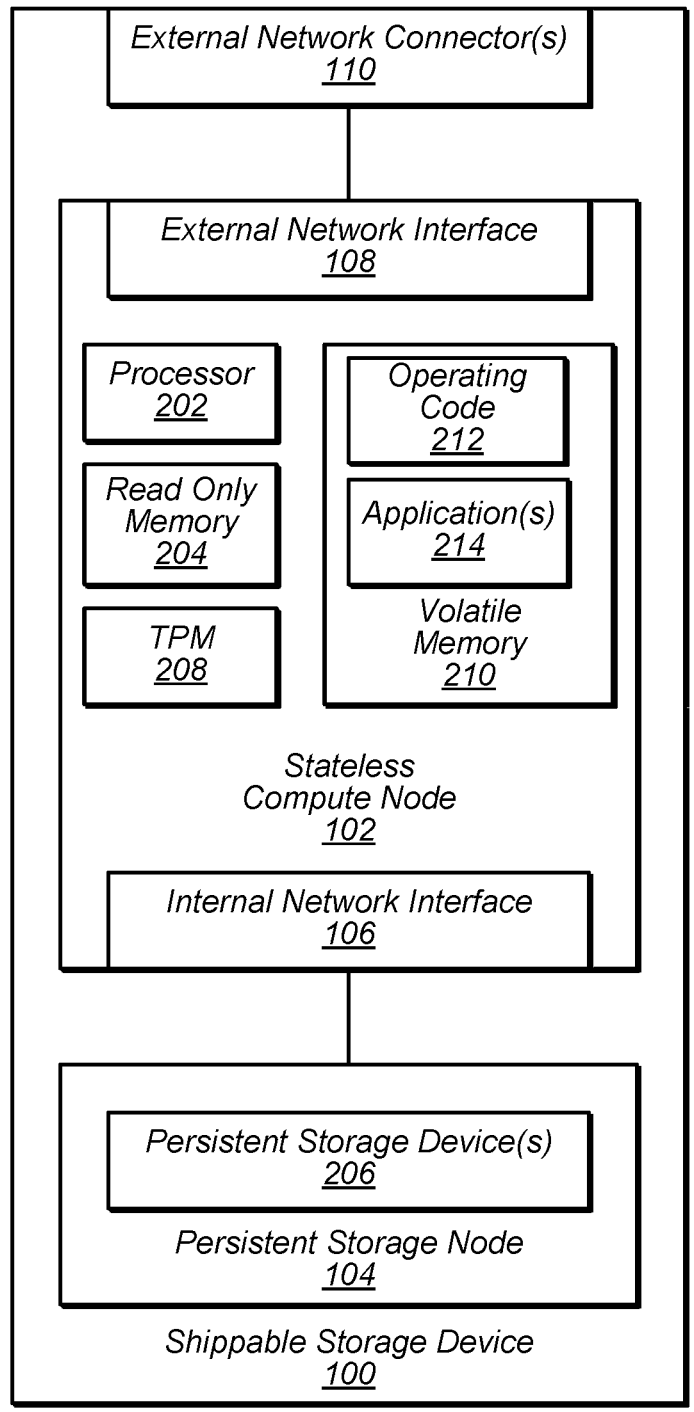
FIG. 2 is a logical block diagram of a shippable storage device, according to some embodiments.

FIG. 2 is a logical block diagram of a shippable storage device 100, according to some embodiments. The device may be configured with fewer or additional components or modules. Some components or modules may be replaced by other components or modules. For example, the processor 202 and memory 204 may be replaced by firmware, in embodiments. Various components or modules may perform some or all of the processes illustrated in FIGS. 9-10, in embodiments.

As in FIG. 1, the shippable storage device 100 of FIG. 2 includes the persistent storage node 104, the stateless compute node 102, the internal network interface 106, the external network interface 108, and the external network connector 110. In the depicted embodiment, the storage node includes one or more persistent storage devices 206, which may store data, even when power is no longer supplied to the shippable storage device 100. Thus, any reference to a persistent storage device 206 may, in embodiments, refer instead to multiple persistent storage devices 206. The stateless compute node 102 includes the processor 202, the read only memory 204, a trusted platform module (TPM) 208, and a volatile memory 210 that includes operating code 212 and one or more applications 214.

The stateless compute node 102 may execute the operating code 212 and the one or more applications 214 (e.g., via the processor 202) in the volatile memory 318. In embodiments, the operating code 210 comprises code for implementing an operating system or any functions associated with an operating system on the stateless compute node 102 (e.g., one or more hypervisors, one or more virtual machines, etc.). The applications 214 comprise one or more applications that include code that can be executed by the processor 202 and/or the operating code 210. In embodiments, at least some of the data in the volatile memory 210, at least some of which may be generated by the operating code 210 and/or the applications 214, may be transferred to the persistent storage node 104 and stored on the persistent storage device 206.

The operating code 210 and/or the applications 214 may be downloaded and/or transferred from the client network 112, the service provider network 116, or any other suitable source. For example, in some instances, the operating code 210 and/or the applications 214 may be transferred from the persistent storage device(s) 206. Thus, a service of the service provider network 116 may store the operating code 210 and/or the applications 214 onto the persistent storage device(s) 206 as part of a provisioning process for the shippable storage device 100. Further, in some embodiments, the service provider network 116 may also store security information onto the persistent storage device(s) 206, such as a digital signature of an image of the operating code 210 and/or the applications 214. Thus, after receiving the shippable storage device 100, the client network 112a may validate that the operating code 210 and/or the applications 214 by determining that the security information (e.g., digital signature of the image) is still present on the shippable storage device 100 (e.g., by querying the device). If the security information is not present, then the client network 112a may invalidate the operating code 210 and/or the applications 214 and prevent them from executing.

In embodiments, in response to providing power to the shippable storage device 100, the stateless compute node 102 executes instructions in the read only memory 204 that cause the stateless compute node 102 to announce a presence of the shippable storage device 100 to the client network 112 via the external network connector 110.

After that, the stateless compute node 102 may receive, via the external network connector 110, a request to authenticate the shippable storage device 100. In some embodiments, the request may be received from the client network 112 or the service provider network 116. In response to the request to authenticate, the stateless compute node 102 may then provide, via the external network connector 110, authentication information based on security information pre-provisioned within the stateless compute node 102 (e.g., pre-provisioned in a secure area by the service provider network 116, such as a secure area of a TPM).

In an embodiment, the request to authenticate may include a value (e.g., a clear text string, number, code, or series of characters and/or numbers). The stateless compute node 102 may generate the authentication information by processing the value with the pre-provisioned information. For example, the TPM 208 may include an encryption key, digital certificate, or other pre-provisioned security information that is used to encrypt the received value to generate the authentication information (e.g., the encrypted clear text string). The service provider network 116 (or the client network 112a, via authentication software) may then compare the encrypted clear text string received from the shippable storage device 100 to a stored value of the service provider network 116 or the client network 112a (also an encrypted clear text string). If the encrypted clear text string matches the stored value, then the service provider network 116 or the client network 112a may determine that the shippable storage device 100 is authentic (e.g., validate the identity of the device and that the device has not been tampered with). If not, the service provider network 116 or the client network 112a may determine that the shippable storage device 100 is not authentic and may prevent the shippable storage device 100 from executing operating code and/or applications.

In other embodiments, the request to authenticate may instead include an encrypted value and the shippable storage device 100 may decrypt the value using an encryption key, digital certificate, or other pre-provisioned security information of the TPM. The service provider network 116 (or the client network 112a, via authentication software) may then compare the decrypted value (e.g., clear text string) received from the shippable storage device 100 to a stored value of the service provider network 116 or the client network 112a. If there is a match, the service provider network 116 or the client network 112a may determine that the shippable storage device 100 is authentic (e.g., validate the identity of the device and that the device has not been tampered with). If not, the service provider network 116 or the client network 112a may determine that the shippable storage device 100 is not authentic and may prevent the shippable storage device 100 from executing operating code and/or applications.

In response to authenticating the shippable storage device 100, the service provider network 116 may then send a boot image, operating code, and/or application(s) to the shippable storage device 100. Further, the above authentication process may occur after the boot image, operating code, and/or application(s) are transferred to the stateless compute node 102 and/or are executing in the volatile memory 210. For example, if the boot image, operating code, and/or application(s) are transferred from the persistent storage device(s) 206, then the service provider network 116 or the client network 112a (e.g., via authentication software) may use the above authentication process to authenticate the shippable storage device 100. Thus, in embodiments, a service provider or a client may use the above process to validate the hardware and/or software of the shippable storage device 100 (e.g., verify that the hardware and/or software is from the service provider network 116 and not tampered with), even when the software is provided by the shippable storage device 100 itself.

In embodiments, the shippable storage device 100 may include additional components, at least some of which may reside separate from the stateless compute node 102 and the persistent storage node 104. For example, the shippable storage device 100 may include a display driver that communicates with a display for showing a shipping address. To instruct the display to display an address, a processor may execute computer instructions from a memory that sends messages to the display driver to cause the address to be displayed. In embodiments, the shippable storage device 100 may include a wireless interface configured to receive (e.g., via cellular or Wi-Fi network) instructions from a service provider. For example, the service provider network 116 may send updated address information to the shippable storage device 100 via a cellular network such that the displayed address of the device is updated en route, thereby changing the destination for the device in-flight such that the device is shipped to the updated address instead of a prior address.

In some embodiments, the persistent storage device 206 may include any combination of non-volatile storage such as hard drives or flash memory. The persistent storage device 206 may be configured (e.g., during a provisioning process) to store large amounts of processed data or encrypted data (e.g., from a large data store such as a customer storage system) during shipment from the customer location to a service provider location where the data is transferred to a service provider storage system.

In some instances, the shippable storage device 100 may include a power source that may powers at least some of the various electronic components of the shippable storage shippable storage device 100, which may include sensor(s) and sensor interface(s). Thus, any of various sensor(s) may be incorporated into shippable storage device 100. The sensor interfaces may perform various functions such as conversions of data, analysis of sensor output and output of information based on the analysis or the like.

In embodiments, the TPM 208 may provide additional security features for the shippable storage device 100. For example, after the service provider network 116 receives a device from a customer, the service provider network 116 may communicate with the TPM 208 to determine whether a change has been made to the configuration of the shippable storage shippable storage device 100. Changes to the shippable storage shippable storage device 100 configuration may indicate that the shippable storage shippable storage device 100 was tampered with and that a third party may have accessed data on the shippable storage shippable storage device 100. In some embodiments, the client may perform the above verification processes when receiving a device from the shippable service provider network 116.

Figure 3:
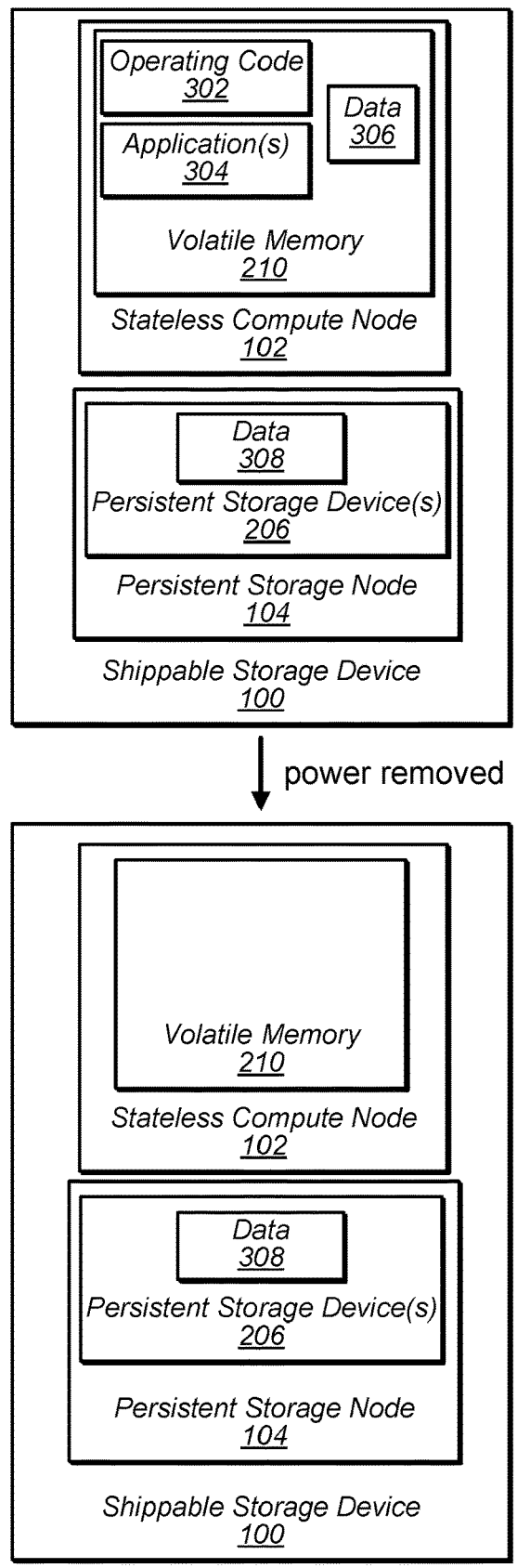
FIG. 3 is a logical block diagram of a shippable storage device before and after executing one or more applications, according to some embodiments.

FIG. 3 is a logical block diagram of a shippable storage device 100 before and after removing power, according to some embodiments. Shippable storage device 100 shows a device in a powered state, and depicts the persistent storage device 206, the volatile memory 210, operating code 302, one or more applications 304, and data 306. In embodiments, the data 306 may include client data 114 received from an external client network 112 and/or data generated by the one or more applications 304.

In embodiments, the one or more applications 304 may include an encryption application and the generated data may include encrypted data generated by the encryption application. In various embodiments, the generated data may include other types of data generated by other types of applications. In some embodiments, an application first generates data, and then an encryption application encrypts the generated data before it is transferred to the persistent storage node 104. The data 308 may be at least a portion of the data 306 identified by the operating code 302 and/or identified by the one or more applications 304 for transfer to the persistent storage device 206. At least some of the data 306 may not be transferred to the persistent storage device 206. For example, encryption keys that are used to encrypt data may not be transferred.

Shippable storage device 100 shows the same device, after power is removed from the device. Power may be removed from the shippable storage device 100 by disconnecting a power cable to the device, turning off a power source to the device, or any other suitable means for removing power to the device. As shown, the volatile memory 210 of the shippable storage device 100 has been cleared in response to removal of power to the shippable storage device 100. In embodiments, at least a portion, substantially all, or all of the data 306 in the volatile memory 210 is removed from the volatile memory 210 upon removal of power.

In various embodiments, upon removal of power, a state of the operating code 302, a state of the one or more applications 304, at least a portion of the data 306, and/or other data is not persisted on the stateless compute node 102. In embodiments, any other information of or used by the operating code 302 and/or the one or more applications 304 is also removed from the volatile memory 210 upon removal of power. Thus, in embodiments, the contents of the volatile memory 210 are cleared upon removal of power, such that the contents of the volatile memory 210 is the same or substantially similar as after providing power to the shippable storage device (e.g., before downloading any contents into the volatile memory 210, such as a boot image, operating code 302, and/or one or more applications 304).

In embodiments, the one of the physical characteristics of the volatile memory 210 is removal and/or loss of any data stored within the volatile memory 210 after power is removed from the volatile memory 210 (e.g., by removing power to the shippable storage device 100). Thus, a client may be confident that one or more types of data, such as unencrypted data or encryption keys, is removed from the volatile memory 210 (and the entire shippable storage device 100) upon removal of power. For example, if an encryption application is not permitted to save unencrypted data or encryption keys to the persistent storage device 206, then the client may be confident that unencrypted data and encryption keys are no longer stored on the shippable storage device 100 after removal of power.

Figure 4:
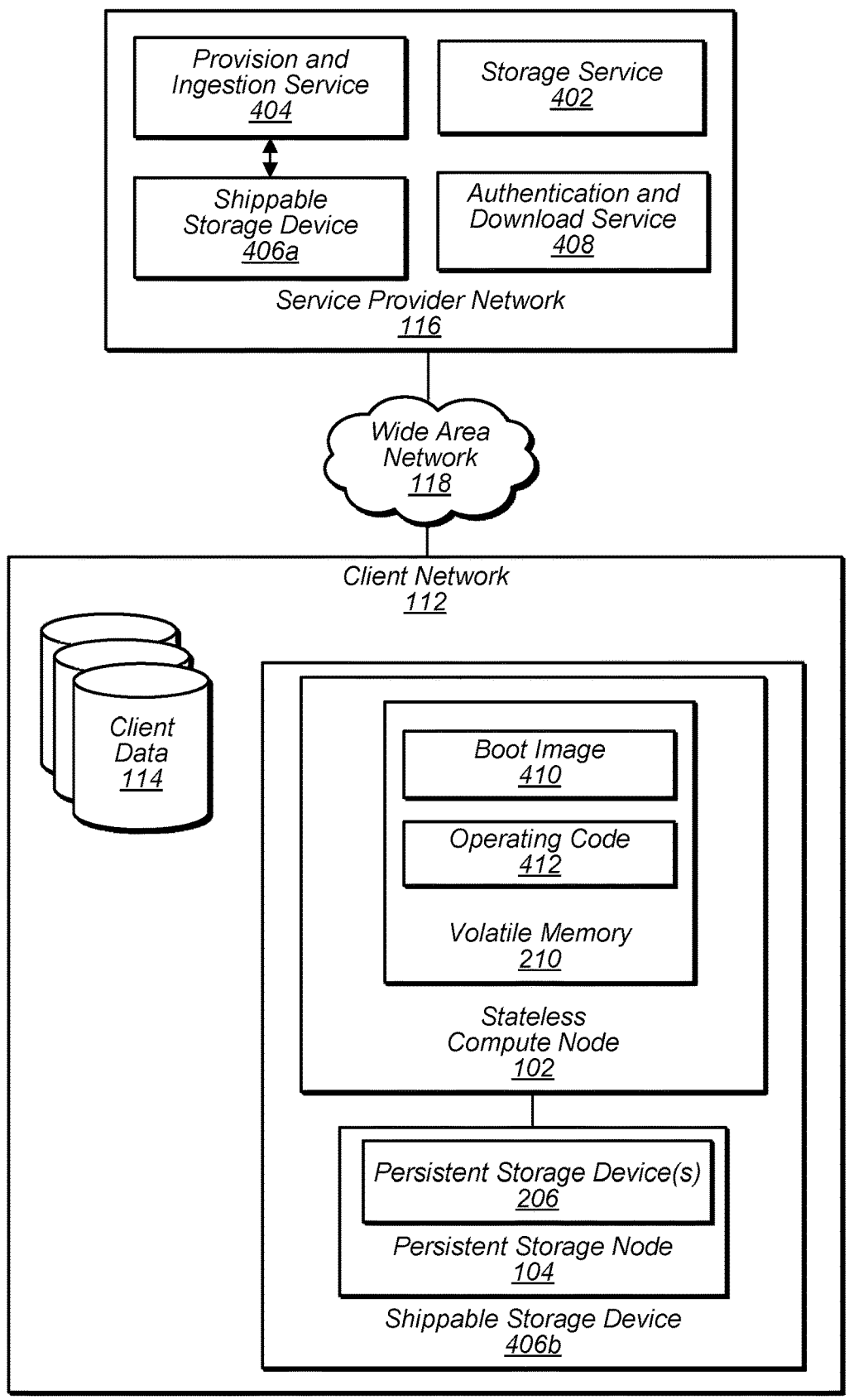
FIG. 4 illustrates a system for executing one or more applications and securely storing data using a shippable storage device, according to some embodiments.

FIG. 4 illustrates a system for executing one or more applications and securely storing data using a shippable storage device 100, according to some embodiments. In some instances, the service provider network 116 may be set up by an entity such as a company or a public sector organization to provide one or more services (such as various types of cloud-based storage and computing) accessible via the Internet and/or other networks to a customer. The service provider network 116 may include numerous data centers hosting various resource pools, such as collections of physical and/or virtualized computer servers, storage devices, networking equipment and the like, needed to implement and distribute the infrastructure and services offered by the service provider network 116. In embodiments, the service provider network 116 may provide a storage service 402 to transfer and store at least some of the client data 114 to one or more storage devices of the service provider network 116. In some embodiments, the client data 114 that is transferred to the service provider network 116 may be organized into one or more different logical or physical locations (e.g., buckets) within the service provider network 116, where each bucket stores one or multiple data objects or files.

In some embodiments, a customer may submit a request via a console interface and/or programmatic application of a requesting computer device (e.g., a computer device of the client network 112) to the service provider network 116 to create a data import job for importing at least some of the client data 114 to the service provider network 116. The computer device may provide a user interface and/or application that allows the customer to submit the job request to the service provider network 116 (e.g., via the wide area network 118). In some embodiments, the customer provides information for the data import job, such as one or more locations at the service provider network 116 to store client data 114 (e.g., one or more buckets). In an embodiment, the customer may also indicate a role to assign to the service provider network 116 (e.g., read/write and other permissions associated with importing the client data 114). In some instances, the customer may also select one or more encryption keys to use for encrypting data for the import job. For example, the customer may select one or more encryption keys stored at the service provider network 116 that belong to or are assigned to the customer. In an embodiment, the encryption keys are stored at the service provider network 116. In some embodiments, the customer may instead or additionally request that one or more new encryption keys be generated by the service provider network 116 for the data import job.

After receiving the job information from the customer, a provision and ingestion service 404 of the service provider network 116 may start the process of provisioning a shippable storage device 406a for a new import job. For example, the provision and ingestion service 404 may write information to a shippable storage device 406a or cause other services to write information to the shippable storage device 406a that prepares the shippable storage device 406a for secure data transfer. In some embodiments, a provision and ingestion service 404 or other service writes information to the shippable storage device 406a to prepare the shippable storage device 406a for secure data transfer.

In various embodiments, the provision and ingestion service 404 represents two or more separate services that each provide different services. For example, the provision and ingestion service 404 may include a first service that provides provisioning services before shipping a shippable storage device 406a to a customer and a second service that provides data ingestion services after receiving the shippable storage device 406a from a customer.

In some embodiments, the information written the shippable storage device 406a may include security information such as one or more encryption keys or certificates, address information, and/or other device-related information. After the shippable storage device 406a is provisioned with the information, a display of the shippable storage device 406a may be updated to display the address of the customer that requested the data import job. The service provider network 116 may then ship the shippable storage device 406a to the customer. The shippable storage device 406b may represent the shippable storage device 406a after is arrives at a location of the client network 112.

When the customer receives a shippable storage device 406b, the customer may install the shippable storage device 406b onto the client network 112. For example, a user may connect the shippable storage device 406b to a client device of the client network 112 via an external network connector of the shippable storage device 406b. The client network 112 may be in communication with the service provider network 116 via a network or internet connection (e.g., via the wide area network 118). In embodiments, after the service provider network 116 authenticates the shippable storage device 406b (e.g., using the authentication method described for FIG. 2), the shippable storage device 406b may download a boot image 410 into the volatile memory 318 of the compute node 314. For example, the authentication and download service 408 may authenticate the shippable storage device 406b and transmit the boot image 410 (and/or the operating code 412) to the shippable storage device 406b.

The stateless compute node 102 may then determine whether the boot image 410 is valid. To determine whether the boot image 410 is valid, the stateless compute node 102 may compute one or more values based on the boot image 410 and determine whether the one or more computed values match one or more corresponding pre-provisioned values within the stateless compute node 102 (e.g., pre-provisioned values stored within the read only memory 204 or the TPM 208). For example, the one or more computed values may be checksum values that are calculated based on the boot image 410 and one or more configuration characteristics and/or values of the stateless compute node 102. If the one or more computed values match the one or more corresponding pre-provisioned values, then the stateless compute node 102 may validate the boot image 406. If the values do not match, then the stateless compute node 102 may invalidate the boot image 410 and prevent the boot image 410 from executing.

In some instances, in response to validating the boot image 406, the stateless compute node 102 may execute the validated boot image 410 in the volatile memory 210. In embodiments, the executing of the boot image 410 causes the stateless compute node 102 to download operating code 412 and/or one or more applications 410. The stateless compute node 102 may then execute operating code 412 and/or the one or more applications 410. In embodiments, the one or more applications 410 do not access writeable persistent storage other than through the internal network interface 106 according to a networking protocol. Further, in some instances, the volatile memory 210 is cleared upon removal of power to the shippable storage device 100.

In various embodiments, data may be output from the shippable storage device 100. For example, one or more applications 304 may include a video transcoding application that transfers video data from the persistent storage device 206 to the volatile memory 210 via the internal network interface 106. In some embodiments, the video data transferred from the persistent storage device 206 is in a raw format, an originally recorded format, uncompressed format, intermediate uncompressed format, and/or any other format that is different than a desired target format to be output from the shippable storage device 100. The video transcoding application may then transcode the received video data to generate transcoded video data of the target format in the volatile memory 210. The stateless compute node 102 may then output the transcoded video data via the external network connector 110 (e.g., for a target device to process and/or display a video based on the transcoded video data). Thus, in some embodiments, the one or more applications 410 may receive data from the persistent storage device 206, process the data, and output the processed data via the external network connector 110.

In embodiments, the one or more applications 304 may identify client data 114 on the client network 112 to be processed. The one or more applications 304 may then obtain the identified data, process the identified data to generate processed data, and store the processed data on the persistent storage device 206 of the persistent storage node 104 of the shippable storage device 406b.

FIGS. 5-11 illustrate various processes and systems associated with the shippable storage device 100. One or more portions of the illustrated processes may be performed by one or more components of the shippable storage device 100, in embodiments. In some instances, the same or similar processes and systems may be implemented for the service provider network 116 and/or the client network 112 to process and transfer/export data from the service provider network 116 to the client network 112. Further, any job-related information generated or processed may be stored in one or more locations of the service provider network 116, such as the storage 402.

Figure 5:
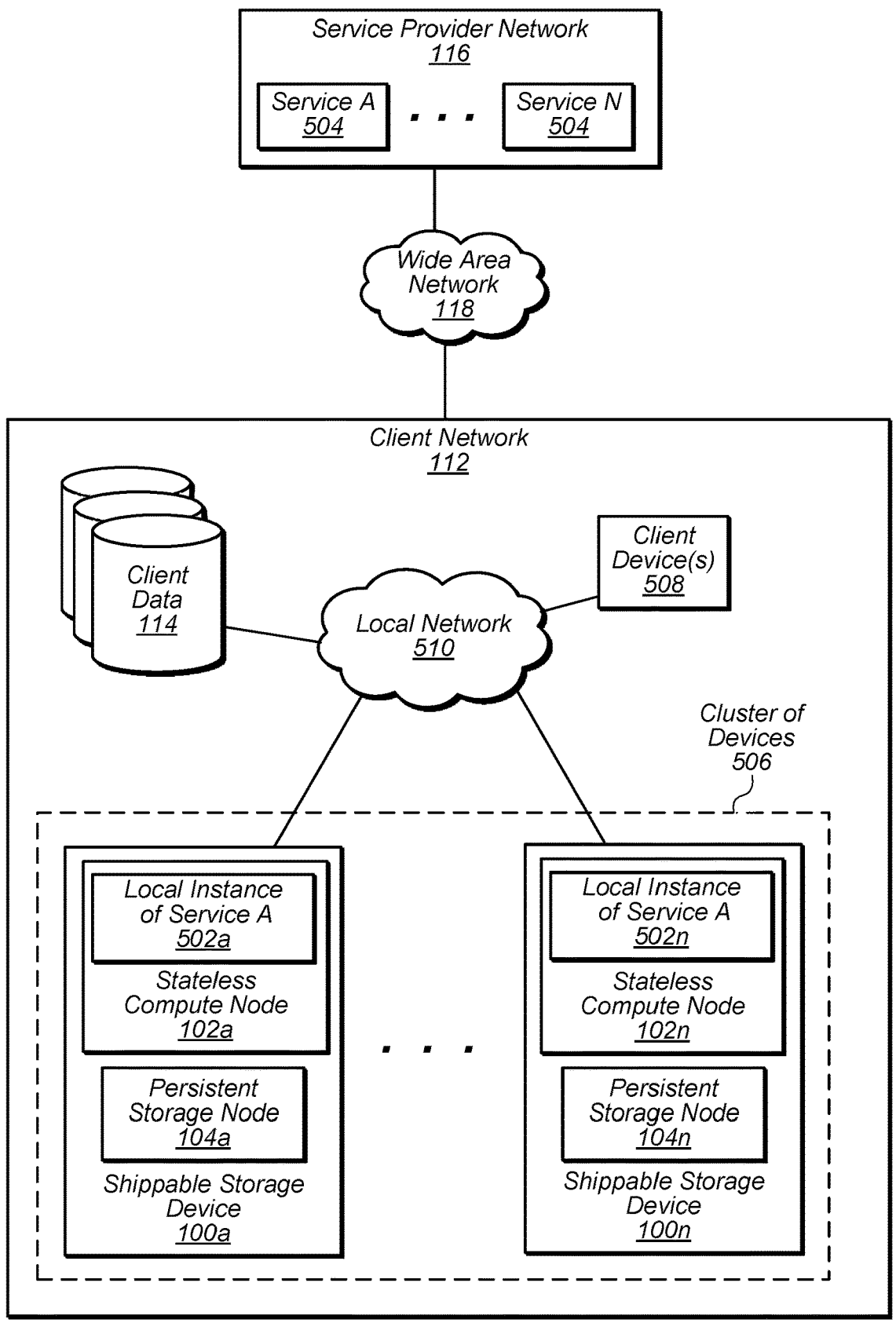
FIG. 5 illustrates a system for executing one or more applications using a cluster of shippable storage devices, according to some embodiments.

FIG. 5 illustrates a system for executing one or more applications using a cluster of shippable storage devices 100, according to some embodiments. Multiple shippable storage devices 100a-100n may be connected to the client network 112. In the depicted embodiment, each of the shippable storage devices 100a-100n may execute a corresponding local instance of service A 502a, where service A 504 is a service provided by the service provider network 116. In embodiments, the service provider network provides multiple services. Moreover, in embodiments, each shippable storage device may execute two or more local instances of two or more corresponding services of the service provider network.

The shippable storage devices 100a-100n may form a cluster of devices 506 providing the local instance of service A 502. In embodiments, one or more client devices 508 may communicate with one or more of the shippable storage devices 100 and one or more storage devices storing the client data 114 to form a local network 510. For example, a client device 508 may use (via the local network 510) the local instance of service A 502a of the shippable storage device 100a.

In embodiments, local instance of service A 502a provides at least a subset of functions provided by service A 504 of the remote service provider network 116. For example, the local instance of service A 502a may perform the same functions/commands through a same or similar interface (e.g., user interface or programmatic interface) as is provided by service A 504 of the service provider network 116. Thus, a client may perform one or more functions faster using the local instance of service A 502a compared to using service A 504 of the service provider network 116, due to less network latency and greater network bandwidth of the local network 510.

In various embodiments, local instances of a service that execute on the shippable storage devices 100 need not correspond to a service of the service provider network 116. For example, a particular network-based service may execute via a plurality of instances on a plurality of corresponding shippable storage devices 100, even though the particular network-based service is not provided by the service provider network 116.

In some embodiments, each of the shippable storage devices 100a-100n includes an additional external network connector coupled to an additional external network interface of the corresponding stateless compute node 102, which the corresponding shippable storage device uses to join and be a part of the cluster of devices 506 to provide a corresponding local instance of a network-based service. In some embodiments, each of the shippable storage devices 100a-100n can join and be a part of the cluster of devices 506 without the need for using an additional external network connector and/or an additional external network interface. For example, each of the shippable storage devices 100a-100n may join and be a part of the cluster of devices 506 using the external network connector 110 and/or the external network interface 108 as described in FIG. 1. However, one of the advantages of using a separate external network connector and/or additional external network interface for a local instance of a network-based service is that data throughput for network-based service may not affect the data throughput of the external network connector 110 and the external network interface 108, which may be used by one or more other applications.

In an embodiment, local instances of a network-based service execute algorithms for data placement on the cluster of devices 506. For example, a network-based service may coordinate, via local instances, which portions of the client data 114 are copied onto corresponding shippable storage devices 100, depending on one or more characteristics of the client network 112 or client data 114 (e.g., transfer speeds for each connection with each shippable storage device 100, format of client data 114, characteristics of a storage destination of the client data 114). In embodiments, local instances of a network-based service may manage the generation of shards based on redundant data encoding (e.g., erasure encoding, data striping, etc.) for the client data 114. Each generated shard may be stored on a corresponding device of the cluster of devices 506 (e.g., stored in a persistent storage device 206 of a corresponding persistent storage node 104).

In some instances, in response to the service provider network 116 determining that multiple shippable storage devices 100 will be required for an amount of data for a particular data import job request, the service provider network 116 will create two or more new data import jobs, wherein each of the new data import jobs corresponds to a different portion of the client data 114 to be imported. Further, each of the new data import jobs may correspond to a different shippable storage device 100.

In some embodiments, each of the shippable storage devices 100 may include one or more additional network connectors and/or interfaces. In embodiments, at least one or more of the additional network connectors and/or interfaces may be a different type of connector and/or interface (e.g., RJ45, SPF, optical, etc.). In some embodiments, any other suitable options for a network interface type may be available (e.g., for selection by the user).

Figure 6:
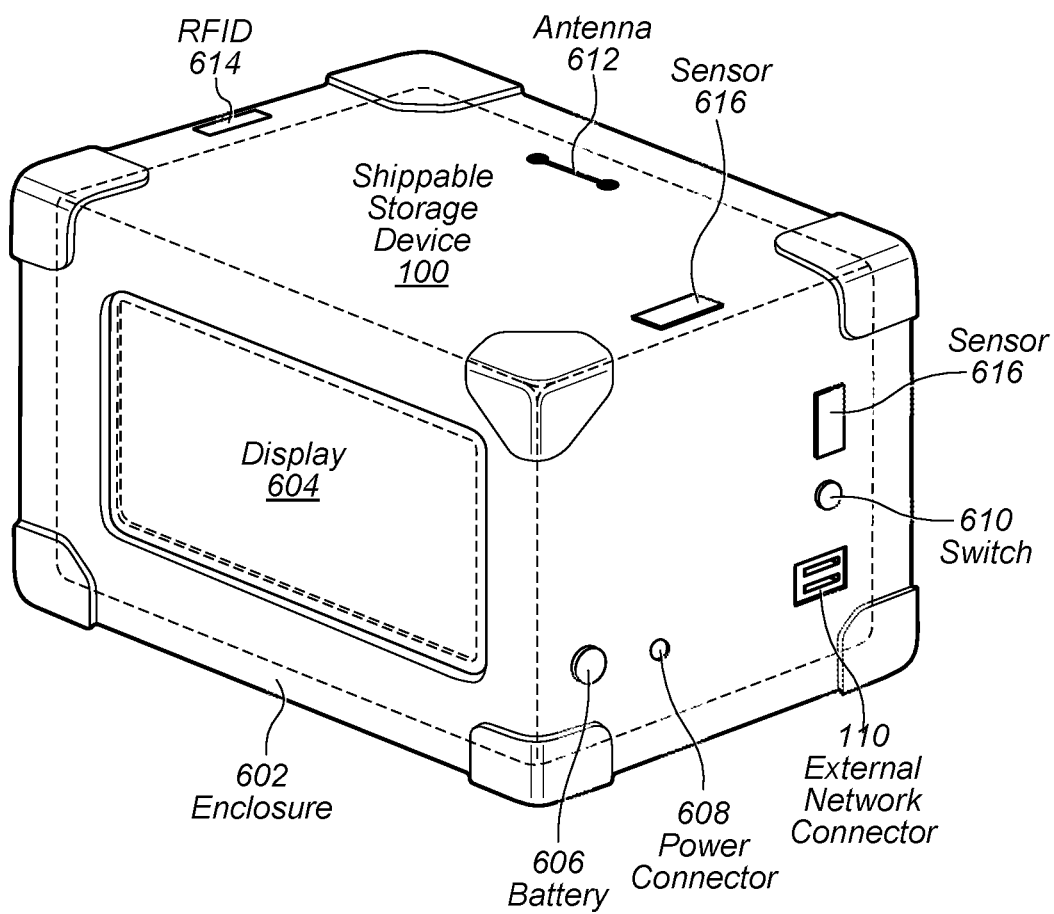
FIG. 6 illustrates a shippable storage device, according to some embodiments.

FIG. 6 illustrates a shippable storage device 100, according to some embodiments. The depicted shippable storage device 100 may be used to execute one or more applications, process customer data, securely store the data, and move large amounts of customer data off of customer storage networks or servers to other storage networks or servers, when other forms of transfer (e.g., broadband data transmission) are unavailable or cost or time prohibitive, for example. Embodiments of the shippable storage device 100 may include more, less, or different features or components than those depicted, in embodiments. The shippable storage device 100 may include any of the components described in the other figures (e.g., the stateless compute node 102 and the persistent storage device 206.

In the depicted embodiment, shippable storage device 100 includes an enclosure 602, which may be surrounding the stateless compute node 102, the persistent storage device 206, and one or more other components. The persistent storage may include any type of storage such as, but not limited to hard disk drives, optical media, magnetic tapes, memristor storage, persistent RAM or solid state storage devices. The enclosure may be ruggedized (e.g., according to various standards, such as military standards or electronics industry standards) and may be configured with an outward-facing electronic display 604 such that when enclosed by the enclosure, the storage node, the compute node, the enclosure, and the electronic display form a self-contained shipping container suitable for shipping without any additional packaging, labeling or the like and such that the electronic display 604 acts as to display a destination location (e.g., in lieu of a shipping label). In embodiments, the enclosure 602 and the display 604 act as reusable shipping components in lieu of cardboard boxes and shipping labels. The enclosure may include various mechanisms to facilitate movement of the shippable storage device 100, such as rollers, handles or the like.

In some embodiments, there may be one or more additional displays. For example, an additional outward-facing electronic display may be on the same side or a different side of the shippable storage device 100. In some instances, the additional display may be usable when the shippable storage device 100 is attached to an external network via the external network connector 110 and/or when an external power source is provided to the shippable storage device (e.g., via the power connector 608). The additional display may accept user input (e.g., via touch input), to set or change one or more configuration settings of the shippable storage device 100 and/or the client network 112.

The shippable storage device 100 is illustrated with battery 606 and power connection 608 for powering some or all of the components of the shippable storage device 100 that require power to function. The power connection 608 may be configured to connect the shippable storage device 100 to an external power source, in embodiments. The power connector may power the stateless compute node 102 and/or the persistent storage device 206, in some embodiments. Other sources of power are contemplated, such as kinetic energy sources that rely upon the motion during shipping to power the shippable storage device 100, solar energy sources, or the like. Any of various power sources may power the electronics (e.g., the display or the storage) of the shippable storage device 100.

The display 604 may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The shippable storage device 100 may be configured with multiple displays 604, in some embodiments. For example, some carriers or fulfillment centers label three sides of a shipping container such that the destination of the container can be scanned or read irrespective of the orientation of the container. Similarly, multiple displays can be incorporated into multiple sides of the enclosure 602 of the device. For example, the enclosure may be configured with 1-6 or more displays, in some embodiments. The various displays maybe configured such that the displays are computer readable (e.g., via scanner).

The shippable storage device 100 is illustrated with the external network connector 110. The external network connector 110 may act as interface between the shippable storage device 100 and various networks, such as LANS, WANS or the like (e.g., via various protocols, such as iSCSI or Ethernet). In some embodiments, the external network connector 110 may act as an interface directly to another device (e.g., via SCSI). In some instances, the external network connector 110 may include two or more different types of interfaces (e.g., RJ45, SFP, optical) and/or two or more of the same type of interface.

The shippable storage device 100 is illustrated with switch 610. The switch 610 may act as an on-off power switch or as a switch to activate the display, in some embodiments. Device 100 is also illustrated with antenna 612. The antenna 612 may be configured to facilitate wireless communication between the service provider or customer and the device. For example, the wireless communication may be over various cellular networks, Wi-Fi, or the like (e.g., wide area network 118 or client network 112). For instance, the service provider may send updated address information to the shippable storage device 100 via cellular networks while the shippable storage device 100 is en route to some location. The updated address information may be displayed via the display 604 such that the shippable storage device 100 is rerouted on the fly, for example. In other embodiments, the wireless communication channel may be used to send updated shipping information for display while the device is located at the customer site. In embodiments, cellular networks may be used to track the device.

The shippable storage device 100 is illustrated with radio frequency identification (RFID) 614. The RFID may assist with tracking the device, in some instances. For example, devices may be identified during the provisioning process via a respective RFID or devices may be identified upon receipt at the customer or upon return to the service provider by a respective RFID. The RFID may be used to track the shippable storage device 100 as the device is routed through a facility, such as through a service providers fulfillment facility (e.g., while routed on a conveyor system).

The shippable storage device 100 is illustrated with various one or more sensors 616. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the shippable storage device 100, such as a drop, quick movement, orientation or location of the shippable storage device 100. The sensor data may be stored locally, sent over the network 130 or displayed via display 604.

The shippable storage device 100 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

The shippable storage device 100 may be configured as one or more other types of network-based device or other electronic devices, such as transient local hardware for example. In an example, non-exhaustive list, device 100 may be configured as various combinations of cryptographic hardware and software (e.g., as a type 1 cryptographic device), as a storage gateway, as a web service, a firewall, a high-assurance guard, a server, virtual machine image, one or more dongles, a data warehousing solution or database service box, or the like.

Figure 7:
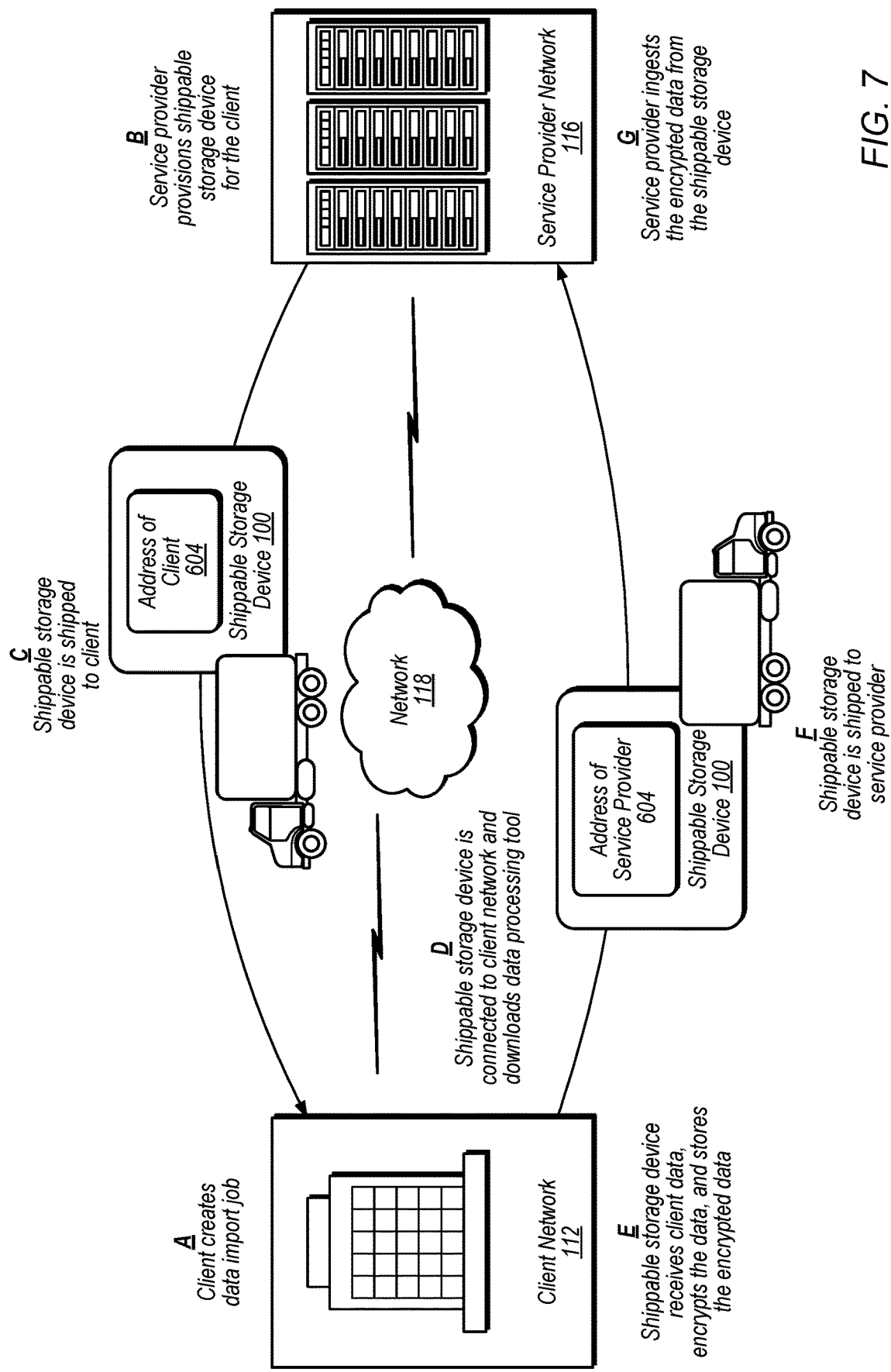
FIG. 7 illustrates a system and a process for executing one or more applications and securely transferring data using a shippable storage device, according to some embodiments.

FIG. 7 illustrates a system and a process for executing one or more applications and securely transferring data using a shippable storage device 100, according to some embodiments. The illustrated embodiment depicts movement of the shippable storage device 100 from a location of a service provider network 116 to a location of a client network 112 and back to the service provider network 116 as well as various processes A-G that are performed along the way by various entities. The shippable storage device 100 depicted in FIG. 1 may be the same as the shippable storage device 100 depicted in FIGS. 1-2 and 8-11, in embodiments.

In some embodiments, a customer may have other location with networks and the shippable storage device 100 may be shipped to those locations instead of, in addition to, before, or after the depicted shipment C. In some embodiments, multiple different shippable storage devices may be shipped to various locations at the same time as the depicted shipment. Shippable storage devices 100 may be shipped to entities with networks other than customers, for example but not limited to, various other enterprises, government entities, other service providers or the like.

In the depicted embodiment, (A) a customer creates, generates or requests that a data import job be performed. The data import job creation or request may be performed via a console interface such as a network-based page or site provided by the service provider network 116 that the customer accesses via a computing device over one or more networks (e.g., wide area network 118). At (B) the service provider network 116 provisions a particular shippable storage device 100 (e.g., using the provision and ingestion service 404), instructs the shippable storage device 100 to display an address associated with the customer (e.g., obtained during job creation (A)) and ships the shippable storage device 100 to the requesting client network 112 according to data import job information (e.g., job information may be determined during generation of the job at request time, in some embodiments).

At (C), a display 604 of the shippable storage device 100 is updated to display the address of the client network 112 and the shippable storage device 100 is shipped to the location of the client network 112. In some embodiments, the shippable storage device 100 does not have a display 604 or does not use the display 604. In such cases, an address may be written, stamped, or otherwise affixed onto the shippable storage device. In some embodiments, the shippable storage device 100 is shipped within an enclosure, which has the address visible on an outer portion of the enclosure.

At (D), the shippable storage device 100 is connected to the client network 112 using one or more network interfaces of shippable storage device 100 and one or more corresponding network interfaces of the client network 112. A compute node of the shippable storage device 100 then downloads a boot image, operating code, and/or one or more applications from the service provider network 116 via the wide area network 118. In some instances, if the shippable storage device 100 validates the boot image, then the compute node of the shippable storage device 100 uses the boot image to boot up. The compute node then downloads operating code and/or one or more applications from the service provider network 116 via the wide area network 118. The one or more applications are configured to process client data (e.g., encrypt or otherwise process client data) and store the processed data a storage node of the shippable storage device 100. In some embodiments, the boot image, operating code, and/or the one or more applications are obtained from one or more devices of the client network 112 instead of the service provider network 116.

At (E) the one or more applications receive client data and processes the client data (e.g., encrypts the data). The one or more applications then transfer the processed data to a storage node of the shippable storage device (e.g., persistent memory located within the storage node). At (F), the display 604 of the shippable storage device 100 is updated with the address of the service provider network 116 and the device is shipped back to the service provider network 116. For example, the service provider network 116 may send an updated address to the shippable storage device 100 via the network, or the shippable storage device 100 may recognize it is at the client location and automatically update the displayed destination address from a memory store programmed with the next destination during the provisioning step (B).

In some embodiments, the shippable storage device 100 may be sent to one or more other client or customer sites to have additional data processed and stored on the shippable storage device 100 before being sent back to the service provider network 116. At (G) the shippable storage device 100 is received back at the service provider network 116 and connected to a network of the service provider network 116. In some embodiments, the service provider network 116 may then verify that the shippable storage device 100 has not been tampered with. For example, the service provider network 116 may verify that a hardware and/or software configuration of the shippable storage device 100 has not been changed since the customer data was stored on the shippable storage device 100. The customer data is then obtained from the shippable storage device 100 and ingested into the service provider network 116 system. In embodiments, the shippable storage device 100 is then wiped (e.g., the persistent memory of the storage node, other portions of the device) and stored until it is ready to be provisioned for another job.

In some embodiments, the shippable storage device 100 may be sent onto other client locations or other clients distinct from the client to store additional data before the shippable storage device 100 is sent back to the service provider network 116. In some instances, the shippable storage device 100 may be used to distribute data from the service provider network 116 to one or more different sites of the same client, in embodiments. The shippable storage device 100 may be instructed to display various addresses at various times, such that the shippable storage device 100 is used to multi-cast data, for example in either the export or import embodiments. It is contemplated that the various addresses may be stored on the shippable storage device 100 at once, such as when the shippable storage device 100 is provisioned, for example, or the various addresses may be sent to the shippable storage device 100 over a network, such as a cellular network or via a client or provider network or combination thereof. In embodiments, the shippable storage device 100 may include logic configured to update the displayed address based on the shippable storage device 100 sensing a geographical position or location of the shippable storage device 100. For instance, a shippable storage device 100 that determines (e.g., based on a GPS sensor or cellular triangulation) that it has arrived at one location, may be configured to display the next address stored in memory of the device.

Please note that previous descriptions are not intended to be limiting, but are merely provided as examples of processing data and securely transferring data using a shippable storage device. For instance, one or more steps may be removed and/or one or more steps may be added to process data and securely transfer data using a shippable storage device. Moreover, in various embodiments, steps may be performed in different sequences.

Figure 8:
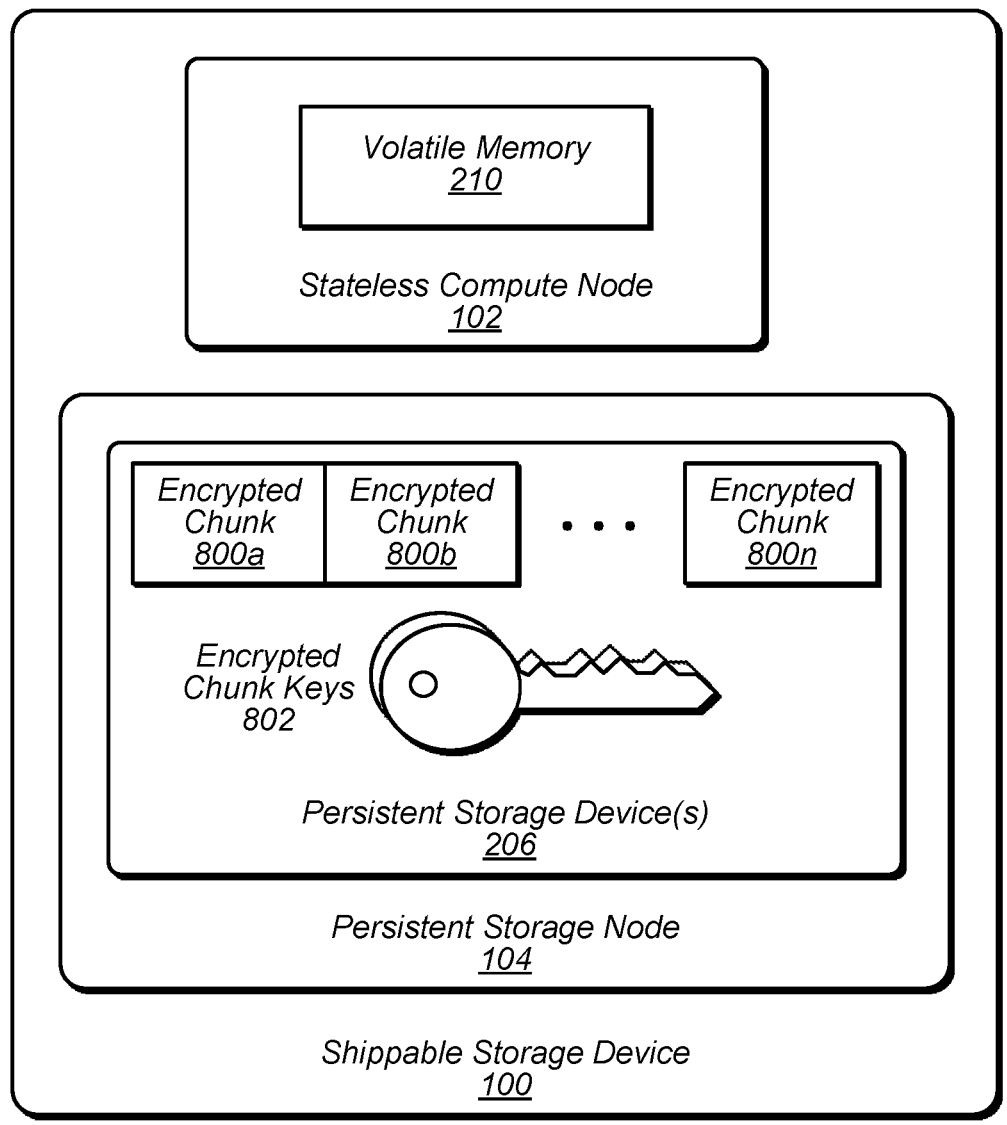
FIG. 8 is a logical block diagram of a shippable storage device for shipping to a storage service provider, according to some embodiments.

FIG. 8 is a logical block diagram of a shippable storage device 100 for shipping to a storage service provider, according to some embodiments. In the depicted embodiment, one of the one or more applications 304 that execute in the stateless compute node 102 includes a data transfer tool that separates the received client data 114 into chunks, generates a different chunk key for each chunk, encrypts each chunk using the corresponding respective chunk key, and stores the encrypted chunks 800 into the persistent storage device 206 of the persistent storage node 104. In the example embodiment, the data transfer tool may also encrypt the chunk keys and store the encrypted chunk keys 802 into the persistent storage device 206. For example, a designated one or more client keys may be received from the remote service provider network 116 and/or the client and used to encrypt the chunk keys. The one or more client keys may be securely stored at the storage service provider and/or the client network 112. In some embodiments, the encrypted chunk keys 802 are not stored into the persistent storage device 206, but are instead transmitted to the service provider network 116 separate from the shippable storage device 100 (e.g., transmission via the wide area network 118). However, any other suitable encryption techniques may be used to encrypt the client data 114.

In various embodiments, the data transfer tool may perform other processing to the obtained client data 114 instead of or in addition to encryption of the client data 114. For example, instead of encryption, the data transfer tool may perform video transcoding, image processing or any other type of processing that transforms the obtained client data 114 into processed data. The data transfer tool may then store the processed data into the persistent storage device 206 or may first encrypt the processed data before storing it into the persistent storage device 206.

In some embodiments, the data transfer tool do not access writeable persistent storage other than through the internal network interface 106 according to a networking protocol. In some instances, the volatile memory 210 is cleared upon removal of power to the shippable storage device 100 so that one or more of the received data that is not encrypted, the unencrypted chunk keys, and the one or more client keys are not persisted within the shippable storage device 100. In embodiments, the volatile memory 210 is cleared upon removal of power to the shippable storage device 100 so that additional contents of the volatile memory 210 are not persisted within the shippable storage device 100 and/or the volatile memory 210 (e.g., a state of one or more applications within the volatile memory 210, other data and/or metadata generated by the one or more applications, etc.). After removal of power, the shippable storage device 100 may be shipped to a location of the storage provider (e.g., the service provider network 116).

In various embodiments, a display 604 of the shippable storage device 100 is updated to display the address of the storage service provider address. For example, in response to completion of storing processed data into the persistent storage device 206, the shippable storage device 100 may display the address of the service provider network 116 on the display 604. In some instances, the service provider network 116 may send the storage server provider address to the shippable storage device 100 via the service provider wide area network 118.

Figure 9:
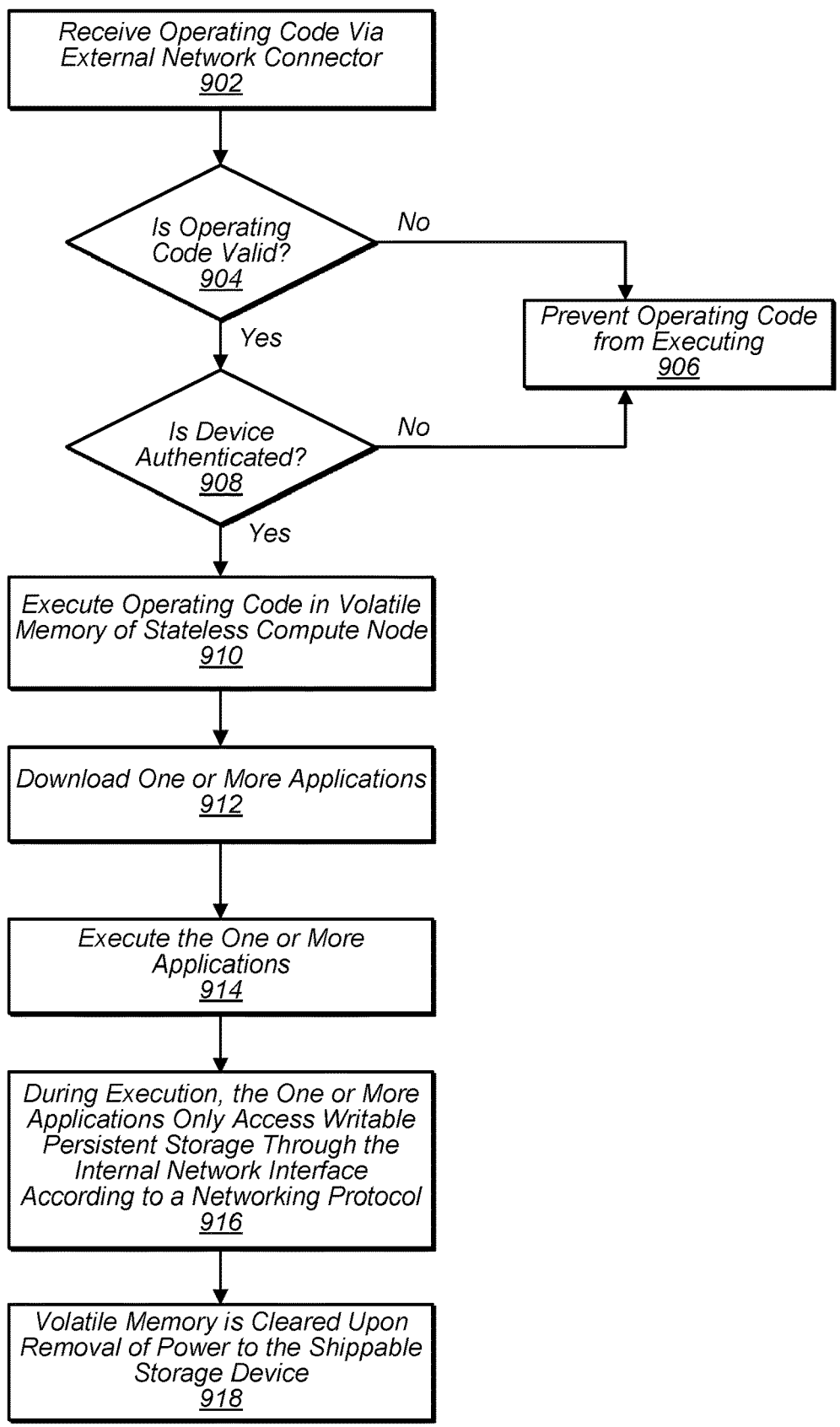
FIG. 9 is a flow diagram of a process for executing one or more applications using a shippable storage device, according to some embodiments.

FIG. 9 is a flow diagram of a process for executing one or more applications using a shippable storage device 100, according to some embodiments. Thus, one or more portions of the illustrated process may be performed via the shippable storage device 100, such as by the stateless compute node 102 and/or other components of the device.

At block 902, the stateless compute node 102 receives operating code via an external network connector 110. In some embodiments, the operating code may include a boot image. At block 904, the stateless compute node 102 determines whether the received operating code is valid. As described above, the various techniques may be used to validate the operating code. If the stateless compute node 102 determines that the operating code is not valid, then at block 906, the stateless compute node 102 prevents the operating code from executing. In embodiments, the stateless compute node 102 may also send a message via the external network connector 110 that indicates the operating code is invalid.

At block 904, if the stateless compute node 102 determines that the operating code is valid, then at block 908, the stateless compute node 102 provides authentication information to allow a client network 112a or a service provider network 116 to determine whether the shippable storage device 100 (and thus the operating code) is authentic. For example, as described above, the stateless compute node 102 may provide, via the external network connector 110, authentication information based on security information pre-provisioned within a secure area of the stateless compute node 102 (e.g., within a TPM 208). If the client network 112a or the service provider network 116 determines that the shippable storage device 100 is not authentic, then at block 906, the client network 112a or the service provider network 116 prevents the operating code from executing (e.g., by disconnecting the device, removing power from the device, terminating the network connection to the device, or any other suitable technique to prevent or abort execution of code on the device).

At block 908, if the stateless compute node 102 determines that the shippable storage device 100 is authentic, then at block 910, the stateless compute node 102 executes the operating code in the volatile memory 210. In some embodiments, the authentication process of block 908 may occur after block 910 (e.g., after the operating code is executing, if the device is authenticated, then one or more applications are downloaded). At block 912, the executing of the operating code causes the stateless compute node 102 to download one or more applications (e.g., download from the service provider network 116 or the client network 112). For example, the one or more applications may include at least one of an encryption application, video transcoding application, image processing applications, and/or other types of applications, at least some of which may process client data 114. In some embodiments, the operating code includes the one or more applications, and therefore executing the operating code includes executing the one or more applications.

At block 914, the stateless compute node 102 executes the one or more applications. At block 916, during execution of the one or more applications, the applications only access writable persistent storage through an internal network interface (e.g., internal network interface 106), according to a networking protocol. At block 918, the volatile memory 210 is cleared upon removal of power to the shippable storage device 100.

Figure 10:
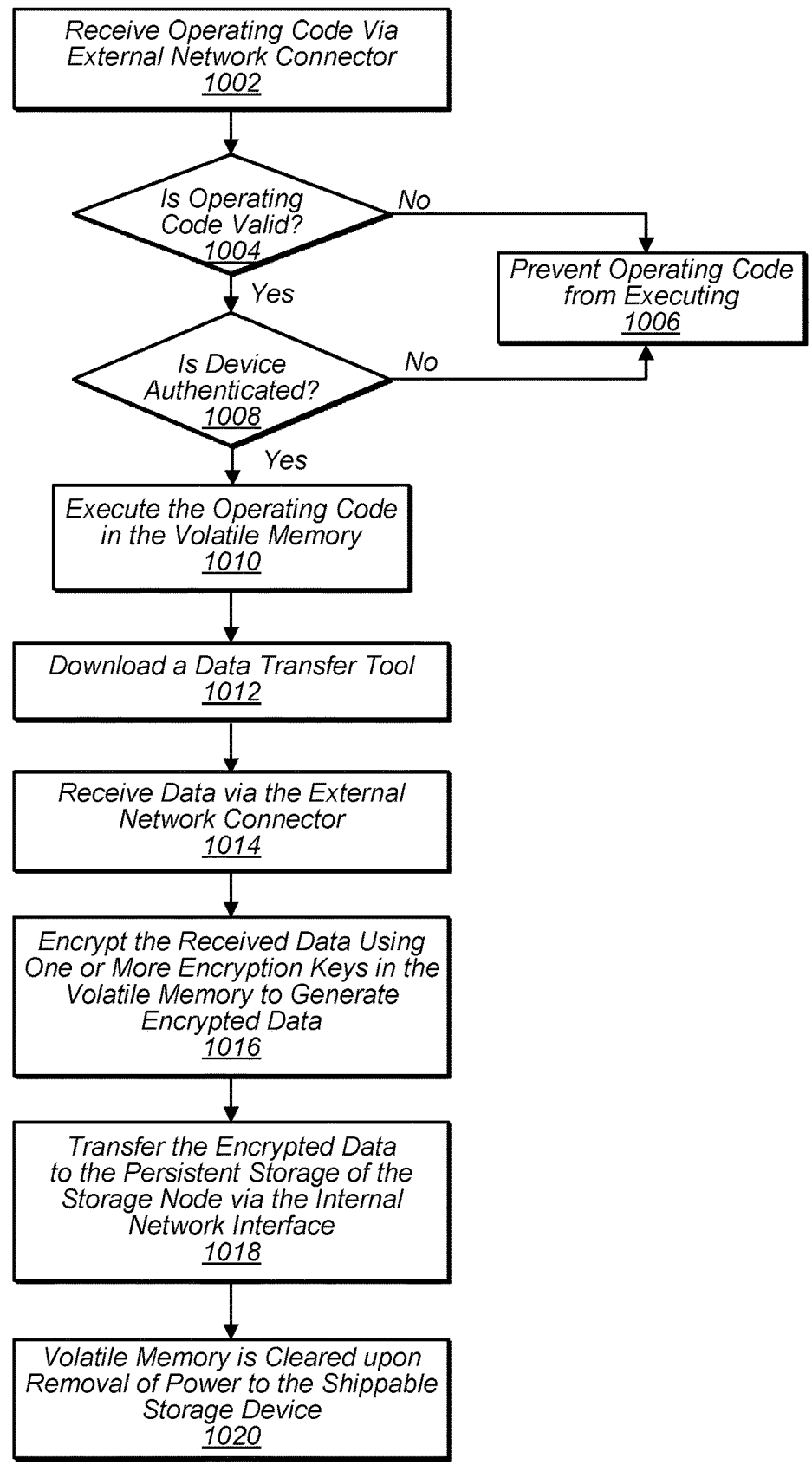
FIG. 10 is a flow diagram of a process for encrypting and storing encrypted data onto a shippable storage device, according to some embodiments.

FIG. 10 is a flow diagram of a process for encrypting and storing encrypted data onto a shippable storage device 100, according to some embodiments. Thus, one or more portions of the illustrated process may be performed via the shippable storage device 100, such as by the stateless compute node 102 and/or other components of the device.

At block 1002, the stateless compute node 102 receives operating code via an external network connector 110. At block 1004, the stateless compute node 102 determines whether the received operating code is valid. As described above, the various techniques may be used to validate the operating code. If the stateless compute node 102 determines that the operating code is not valid, then at block 1006, the stateless compute node 102 prevents the operating code from executing. In embodiments, the stateless compute node 102 may also send a message via the external network connector 110 that indicates the operating code is invalid.

At block 1004, if the stateless compute node 102 determines that the operating code is valid, then at block 1008, the stateless compute node 102 provides authentication information to allow a client network 112a or a service provider network 116 to determine whether the shippable storage device 100 (and thus the operating code) is authentic. For example, as described above, the stateless compute node 102 may provide, via the external network connector 110, authentication information based on security information pre-provisioned within a secure area of the stateless compute node 102 (e.g., within a TPM 208). If the client network 112a or the service provider network 116 determines that the shippable storage device 100 is not authentic, then at block 1006, the client network 112a or the service provider network 116 prevents the operating code from executing (e.g., by disconnecting the device, removing power from the device, terminating the network connection to the device, or any other suitable technique to prevent or abort execution of code on the device).

At block 1008, if the stateless compute node 102 determines that the shippable storage device 100 is authentic, then at block 1010, the stateless compute node 102 executes the operating code in the volatile memory 210. In some embodiments, the authentication process of block 908 may occur after block 910 (e.g., after the operating code is executing, if the device is authenticated, then one or more applications are downloaded). At block 1012, the executing of the operating code causes the stateless compute node 102 to download a data transfer tool (e.g., download from the service provider network 116 or the client network 112). In some embodiments, the operating code includes the data transfer tool. Block 1012 may also include executing the data transfer tool. In embodiments, the data transfer tool does not access any writeable persistent storage other than through the internal network interface 106 according to a networking protocol.

At block 1014, the data transfer tool receives data (e.g., client data 114) via the external network connector 110. At block 1016, the data transfer tool encrypts the received data using one or more encryption keys in the volatile memory 210 to generate encrypted data. At block 1018, the data transfer tool transfers the encrypted data to the persistent storage device 206 of the persistent storage node 104 via the internal network interface 106. At block 1020, the volatile memory 210 is cleared upon removal of power to the shippable storage device 100, so that the received data (e.g., unencrypted data) and the one or more encryption keys are not persisted within the shippable storage device.

Figure 11:
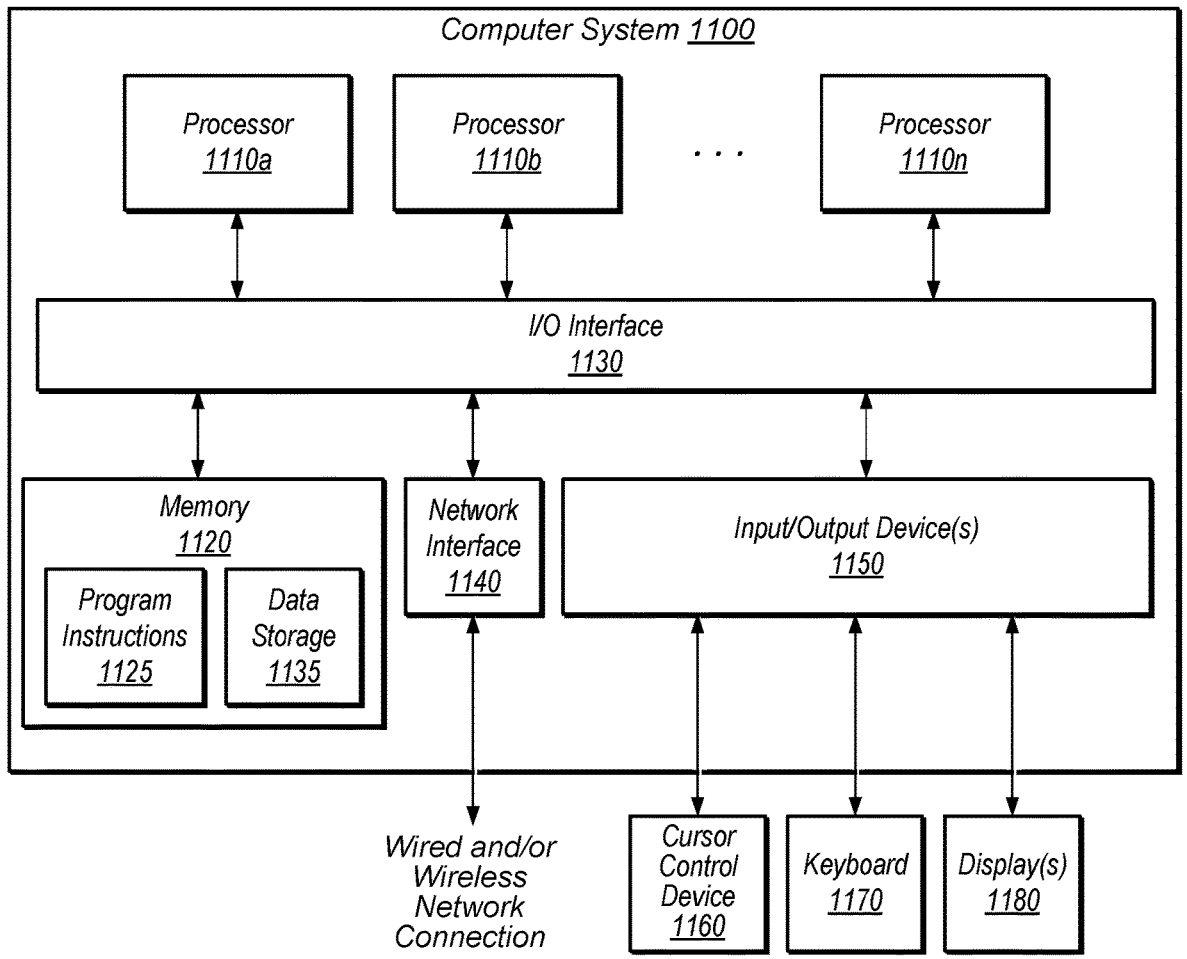
FIG. 11 is a block diagram illustrating an example computer system that implements some or all of the techniques described herein, according to some embodiments.

Any of various computer systems may be configured to implement processes associated with a shippable storage device 100. For example, FIG. 11 is a block diagram illustrating one embodiment of a computer system suitable for implementing some of the systems and methods described herein. In various embodiments, the service provider network 116 and/or the client network 112 may each include one or more computer systems 1100 such as that illustrated in FIG. 11. In embodiments, the shippable storage device may include one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 1120 as program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the shippable storage device 100 and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A shippable storage device, comprising:
a storage node comprising a persistent storage;
an external network connector; and
a stateless compute node comprising:
one or more processors;
a volatile memory;
an internal network interface, wherein the stateless compute node does not include writeable persistent storage, and wherein the stateless compute node is coupled to the storage node via the internal network interface; and
an external network interface configured to couple the stateless compute node to the external network connector;
wherein the stateless compute node of the shippable storage device is configured to:
receive operating code from an external network or a provider network via the external network connector of the shippable storage device;
validate the operating code received by the shippable storage device from the external network or the provider network via the external network connector of the shippable storage device, wherein the operating code is prevented from executing if not validated;
execute the validated operating code in the volatile memory, wherein the validated operating code includes or is configured to download from the external network or the provider network a data transfer tool and one or more encryption keys, wherein the data transfer tool is configured to:
receive data from the external network via the external network connector;
encrypt the received data using the one or more encryption keys in the volatile memory to generate encrypted data; and
transfer the encrypted data to the persistent storage of the storage node via the internal network interface;
wherein the operating code and the data transfer tool do not access writeable persistent storage other than through the internal network interface according to a networking protocol; and wherein the volatile memory is cleared upon removal of power to the shippable storage device so that the operating code, the received data not encrypted, and the one or more encryption keys are not persisted within the shippable storage device.

2. The shippable storage device as recited in claim 1, wherein the validated operating code is further configured to:

download one or more applications in addition to the data transfer tool; and execute the one or more applications, wherein the one or more applications do not access writeable persistent storage other than through the internal network interface according to the networking protocol.

3. The shippable storage device as recited in claim 1, wherein to validate the operating code, the stateless compute node is further configured to:

compute one or more values based at least on the received operating code or the data transfer tool; and determine that the one or more computed values match one or more corresponding values pre-provisioned within the stateless compute node.

4. The shippable storage device as recited in claim 3, wherein the stateless compute node is further configured to:

receive, via the external network connector, a request to authenticate the shippable storage device; and provide, via the external network connector, authentication information based on security information pre-provisioned within the stateless compute node.

5. The shippable storage device as recited in claim 4, wherein the data transfer tool is further configured to:

receive, from a remote storage service provider of the provider network, at least one additional encryption key;

encrypt the one or more encryption keys using the at least one additional encryption key to generate an encrypted one or more encryption keys for sending to the remote storage service provider; and before the removal of power to the shippable storage device, transfer the encrypted one or more encryption keys to the persistent storage of the storage node or transmit the encrypted one or more encryption keys to the storage service provider via a communication network, separate from the shippable storage device.

6. A device, comprising:

a storage node comprising a persistent storage;

an external network connector; and a stateless compute node comprising:

one or more processors;

a volatile memory;

an internal network interface, wherein the stateless compute node does not include writeable persistent storage, and wherein the stateless compute node is coupled to the storage node via the internal network interface; and an external network interface configured to couple the stateless compute node to the external network connector;

wherein the stateless compute node of the device is configured to:

receive operating code from an external network or a provider network via the external network connector of the device;

validate the operating code received by the device from the external network or the provider network via the external network connector of the device, wherein the operating code is prevented from executing if not validated;

execute the validated operating code in the volatile memory, wherein the validated operating code includes or is configured to download from the external network or the provider network one or more applications;

validate the one or more applications, wherein the one or more applications are prevented from executing if not validated;

execute the one or more applications;

wherein the one or more applications do not access writeable persistent storage other than through the internal network interface according to a networking protocol; and wherein the volatile memory is cleared upon removal of power to the device so that the operating code and a state of the one or more applications is not persisted on the stateless compute node.

7. The device as recited in claim 6, wherein to validate the operating code, the stateless compute node is further configured to:

compute one or more values based at least on the received operating code; and determine that the one or more computed values match one or more corresponding values pre-provisioned within the stateless compute node.

8. The device as recited in claim 6, wherein the operating code comprises a boot image, and wherein as part of execution of the validated operating code, the stateless compute node is configured to:

boot the stateless compute node using the boot image.

9. The device as recited in claim 6, wherein the one or more applications includes a data transfer tool configured to:

receive data via the external network connector;

encrypt the received data using one or more encryption keys in the volatile memory to generate encrypted data; and transfer the encrypted data to the persistent storage of the storage node via the internal network interface.

10. The device as recited in claim 6, wherein the one or more applications includes a video transcoding tool configured to:

transfer video data from the persistent storage to the volatile memory via the internal network interface;

transcode the received video data to generate transcoded video data; and output the transcoded video data via the external network connector.

11. The device as recited in claim 6, wherein the one or more downloaded applications includes a video transfer tool configured to:

receive video data via the external network connector; and transfer the video data to the persistent storage of the storage node via the internal network interface.

12. The device as recited in claim 6, further comprising an additional external network connector coupled to an additional external network interface of the stateless compute node, wherein the one or more applications include a network-based service configured to:

execute as one of a plurality of instances of the network-based service distributed over a plurality of respective devices that form a cluster of networked devices providing the network-based service, wherein the device is configured to join the cluster of networked devices via the additional external network connector.

13. The device as recited in claim 12, wherein the device is a shippable storage device physically transported from a remote service provider of the provider network, and wherein the network-based service is further configured to:
provide at least a subset of functions that are provided by a network-based service of the remote service provider.

14. A method, comprising:
receiving, by a stateless compute node of a storage device, a boot image, wherein the stateless compute node receives the boot image from an external network or a provider network via an external network connector of the storage device, and wherein the stateless compute node comprises an external network interface coupled to the external network connector and an internal network interface coupled to a storage node of the storage device;
validating, by the stateless compute node of the storage device, the boot image received by the storage device from the external network or the provider network via the external network connector of the storage device; and
executing, by the stateless compute node, the validated boot image in a volatile memory of the stateless compute node;
wherein the boot image does not access writeable persistent storage other than through the internal network interface according to a networking protocol, and
wherein the volatile memory is cleared upon removal of power to the storage device.

15. The method of claim 14, further comprising:
in response to providing power to the storage device, executing instructions of a read only memory of the stateless compute node; and
in response to executing the instructions of the read only memory, announcing a presence of the storage device to the external network via the external network connector.

16. The method of claim 14, further comprising:
prior to the stateless compute node receiving the boot image, receiving, by the stateless compute node via the external network connector, a request to authenticate the storage device; and
providing, by the stateless compute node, authentication information via the external network connector based on security information pre-provisioned within the stateless compute node.

17. The method of claim 14, wherein the validating, by the stateless compute node, the boot image comprises:
computing, by the stateless compute node, one or more values based at least on the received boot image; and
determining that the one or more computed values match one or more corresponding values pre-provisioned within the stateless compute node.

18. The method of claim 14, wherein the executing of the boot image comprises:
downloading, by the stateless compute node via the external network connector, one or more applications; and
executing the one or more applications, wherein the one or more applications do not access writeable persistent storage other than through the internal network interface according to the networking protocol.

19. The method of claim 18, wherein the executing of the one or more applications comprises:
receiving data via the external network connector;
encrypting the received data using one or more encryption keys in the volatile memory to generate encrypted data; and
transferring the encrypted data to the persistent storage of the storage node via the internal network interface.

20. The method of claim 18, wherein the executing of the one or more applications comprises:
transferring video data from the persistent storage to the volatile memory via the internal network interface;
transcoding the received video data to generate transcoded video data; and
outputting the transcoded video data via the external network connector.

* * * * *